United States Patent
Leong

(10) Patent No.: US 10,193,462 B1
(45) Date of Patent: Jan. 29, 2019

(54) POWER CONVERTER USING BI-DIRECTIONAL ACTIVE RECTIFYING BRIDGE

(71) Applicant: Infineon Technologies AG, Neubiberg (DE)

(72) Inventor: Kennith Kin Leong, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/729,920

(22) Filed: Oct. 11, 2017

(51) Int. Cl.
| | | |
|---|---|---|
| *H02M 7/217* | (2006.01) | |
| *H02M 3/335* | (2006.01) | |
| *H02M 3/156* | (2006.01) | |
| *H02M 7/797* | (2006.01) | |
| *H02M 1/10* | (2006.01) | |
| *H02M 7/48* | (2007.01) | |
| *H02M 1/00* | (2006.01) | |

(52) U.S. Cl.
CPC ......... *H02M 3/33584* (2013.01); *H02M 1/10* (2013.01); *H02M 3/156* (2013.01); *H02M 3/33507* (2013.01); *H02M 3/33592* (2013.01); *H02M 7/4807* (2013.01); *H02M 7/797* (2013.01); *H02M 2001/007* (2013.01); *H02M 2001/0074* (2013.01)

(58) Field of Classification Search
CPC ...... H02M 3/33507; H02M 1/32; H02M 3/10; H02M 7/00; H02M 7/217; H02M 3/3125; H02M 3/335; H02H 7/122; H02H 1/4208; H02H 1/4233
USPC .. 363/52, 55, 78, 81, 84, 95, 123, 125, 127, 363/131
See application file for complete search history.

(56) References Cited

U.S. PATENT DOCUMENTS

| | | | | |
|---|---|---|---|---|
| 7,834,597 B1* | 11/2010 | Shekhawat | ............. | H02M 1/32 323/224 |
| 8,749,210 B1* | 6/2014 | Nakao | ................. | H02M 1/4225 323/224 |
| 2008/0129259 A1* | 6/2008 | Endo | .................... | H02M 3/1584 323/271 |

(Continued)

OTHER PUBLICATIONS

Chen, Xidang et al., "A High Efficiency Bridgeless Flyback PFC Converter for Adapter Application", Twenty-Eighth Annual IEEE Applied Power Electronics Conference and Exposition (APEC), 2013, pp. 1013-1017.

(Continued)

*Primary Examiner* — Adolf Berhane
(74) *Attorney, Agent, or Firm* — Murphy, Bilak & Homiller, PLLC

(57) ABSTRACT

Power converters that use bi-directional switches to rectify an AC power source, rather than diode bridges, are provided. In additional to performing rectification, the bi-directional switches also control power flow through the power converter, i.e., the switches effectively implement a switching power supply to provide a desired DC voltage to a load. The use of bi-directional switches that can block current flow in either direction enables a power converter that uses minimal circuitry, has low conduction losses (high efficiency), and can operate in buck and boost modes. Furthermore, via appropriate control, the described power converter circuitry may be used both for converting from AC voltage to DC voltage, and from DC voltage to AC voltage.

21 Claims, 10 Drawing Sheets

(56) References Cited

U.S. PATENT DOCUMENTS

| | | | | |
|---|---|---|---|---|
| 2009/0303762 | A1* | 12/2009 | Jang | H02M 1/4208 |
| | | | | 363/61 |
| 2012/0236439 | A1* | 9/2012 | Nguyen | H02J 7/34 |
| | | | | 361/18 |
| 2013/0051102 | A1* | 2/2013 | Huang | H02M 7/217 |
| | | | | 363/127 |
| 2013/0062614 | A1 | 3/2013 | Tipirneni et al. | |
| 2017/0302179 | A1* | 10/2017 | Bandyopadhyay | H02M 1/08 |

OTHER PUBLICATIONS

Chen, Yong et al., "Classification and Comparison of BPFC Techniques: A Review", Przegiqd Eiektrotechniczny, ISSN 0033-2097, R. 89, 2013, pp. 179-186.

Shin, Bong-Won et al., "High-Efficiency Bridgeless Flyback Rectifier With Bidirectional Switch and Dual Output Windings", IEEE Transactions on Power Electronics, vol. 29, Issue 9, Sep. 2014, pp, 4752-4762.

\* cited by examiner

POWER CONVERTER USING BI-DIRECTIONAL ACTIVE RECTIFYING BRIDGE

TECHNICAL FIELD

The present application relates to circuits and techniques for converting between alternating current (AC) power and direct current (DC) power and, in particular, relates to power converter topologies that use bi-directional switches both for rectifying an AC voltage and stepping the rectified voltage up or down to provide a desired DC voltage, or for converting a DC voltage into a desired AC voltage.

BACKGROUND

AC-to-DC power converters are used to power a variety of common electronic devices including, e.g., laptop and desktop computers. Such AC-to-DC power converters typically include a diode bridge for rectifying AC voltage from an AC power source, and a DC-to-DC voltage converter for converting the rectified voltage into a DC voltage appropriate for powering a load, e.g., an electronic device. Power factor correction (PFC) is often required for power converters having relatively high power requirements, e.g., drawing greater than 75 Watts from an AC line supply. A common technique for implementing PFC within a power converter is to use a boost converter to convert the rectified voltage into a relatively high intermediate voltage which is then stepped down, e.g., using a buck converter, to a DC voltage as required by the load. A disadvantage of such power converters, with boost PFC or not, is that conduction losses within the diode bridge lead to power inefficiencies and associated heat dissipation requirements. In addition to its added circuit complexity (components), boost PFC incurs additional conduction losses through its electronic devices (switches, diodes) and any passive devices (e.g., energy-storage inductor), thereby leading to further power inefficiencies.

Bridgeless power converters eliminate the diode bridge of conventional power converters by using power switches to effectively rectify the AC power input. The power switches used within such power converters typically can only block current flow in one direction. For example, an N-channel enhancement-mode metal-oxide semiconductor field-effect transistor (MOSFET) conducts current from its drain to its source when a sufficiently high voltage is applied to the MOSFET's gate (control) terminal. If the voltage applied to the gate terminal is not sufficiently high, positive current flow is blocked from the MOSFET's drain to its source. However, an intrinsic body diode within the MOSFET allows current flow from the source to the drain regardless of the voltage applied to the gate terminal, provided the voltage drop from the source to the drain is higher than the body diode's threshold voltage. Hence, the MOSFET is not generally able to block positive current flow from its source to its drain.

The fact that power switches within a bridgeless power converter often cannot block current flow in both directions limits the use of these power switches as control switches for a switching buck and boost converter. The dual use of such power switches for rectification and voltage converter control is not feasible across a broad set of power converter topologies, at least when using minimal circuitry. While more complex circuitry or additional circuit stages might be capable of supporting desired power converter topologies, the additional complexity requires additional and undesirable electrical components, e.g., power switches, diodes, inductors, other magnetics. Furthermore, the additional components often incur additional conduction losses, which negate or at least reduce the efficiency advantage that is sought by eliminating the diode bridge.

AC-to-DC power converter topologies that do not include a diode bridge, use minimal circuitry, can achieve both buck and boost operation and are highly efficient are desired.

SUMMARY

According to an embodiment of a power converter, the power converter is configured to convert between alternating current (AC) power and direct current (DC) power, and may be operated as either an AC-to-DC converter or a DC-to-AC converter. The power converter includes first and second AC terminals that are coupled across an AC power source or load, and first and second DC terminals that are coupled across a DC power source or load. A first bi-directional switch couples the first AC terminal to the first DC terminal, while a second bi-directional switch couples the first AC terminal to the second DC terminal. Each of the first and second bi-directional switches may be set to a conducting mode, in which current can conduct in either direction through the switch, or a blocking mode, in which current is blocked in both directions through the switch. A first inductor and a first current-blocking device (e.g., a diode or a synchronous rectification switch) are connected in series and couple the second AC terminal to the first DC terminal. A second inductor and a second current-blocking device are connected in series and couple the second AC terminal to the second DC terminal. A controller of the power converter is configured to control the first and second bi-directional switches so as to operate the power converter in various operational modes. In a first operational mode, a DC voltage across the DC power source or load is lower than an instantaneous voltage across the AC power source or load. In a second operational mode, a DC voltage across the DC power source or load is higher than an instantaneous voltage across the AC power source or load. The controller may operate the power converter in one of these modes, or alternate between them.

According to another embodiment of a power converter, the power converter is configured to convert between alternating current (AC) power and direct current (DC) power, and may be operated as an AC-to-DC converter or a DC-to-AC converter. The power converter includes first and second AC terminals that are coupled across an AC power source or load, and first and second DC terminals that are coupled across a DC power source or load. First and second bi-directional switches are coupled to the first AC terminal and are configured to control the power flow from the AC power source to the DC load, when the power converter is operated as an AC-to-DC converter. Each of the first and second bi-directional switches may be set to a conducting mode, in which current can conduct in either direction through the switch, or a blocking mode, in which current is blocked in both directions through the switch. Each of a first and a second inductor is configured to store energy during a charging interval and release energy during a discharging interval. First and second current-blocking devices (e.g., diodes or SR switches) limit positive current to flow through the inductors in a single direction for a given conversion configuration, e.g. AC-to-DC conversion. A controller of the power converter is configured to control the first and second bi-directional switches so as to operate the power converter in various operational modes. When the power converter is configured as an AC-to-DC converter, the controller operates in a buck mode for a buck interval, during which the voltage across the AC power source is stepped down to supply a DC voltage to the DC load. In a boost mode for a boost interval, the voltage across the AC power source is stepped up to supply a DC voltage to the DC load.

According to an embodiment of a bi-directional active rectifying bridge (BARB), the BARB is configured to rectify AC voltage provided from an AC power source. First and second AC terminals are coupled across the AC power source. First and second rectified terminals are coupled across an output and supply a rectified voltage at the output A first bi-directional switch couples the first AC terminal to the first rectified terminal, and a second bi-directional switch couples the first AC terminal to the second rectified terminal. Each of the first and second bi-directional switches may be set to a conducting mode, in which current can conduct in either direction through the switch, or a blocking mode, in which current is blocked in both directions through the switch. A first current-blocking device (e.g., a diode or synchronous rectification switch) couples the second AC terminal to the first rectified terminal, and a second current-blocking device couples the second AC terminal to the second rectified terminal. A controller of the power converter is configured to control the first and second bi-directional switches so as to provide the rectified voltage at the output, wherein the control of these switches is based upon a measured voltage across the AC power source.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments may be combined unless they exclude each other. Embodiments are depicted in the drawings and are detailed in the description that follows.

DETAILED DESCRIPTION

Figure 1:
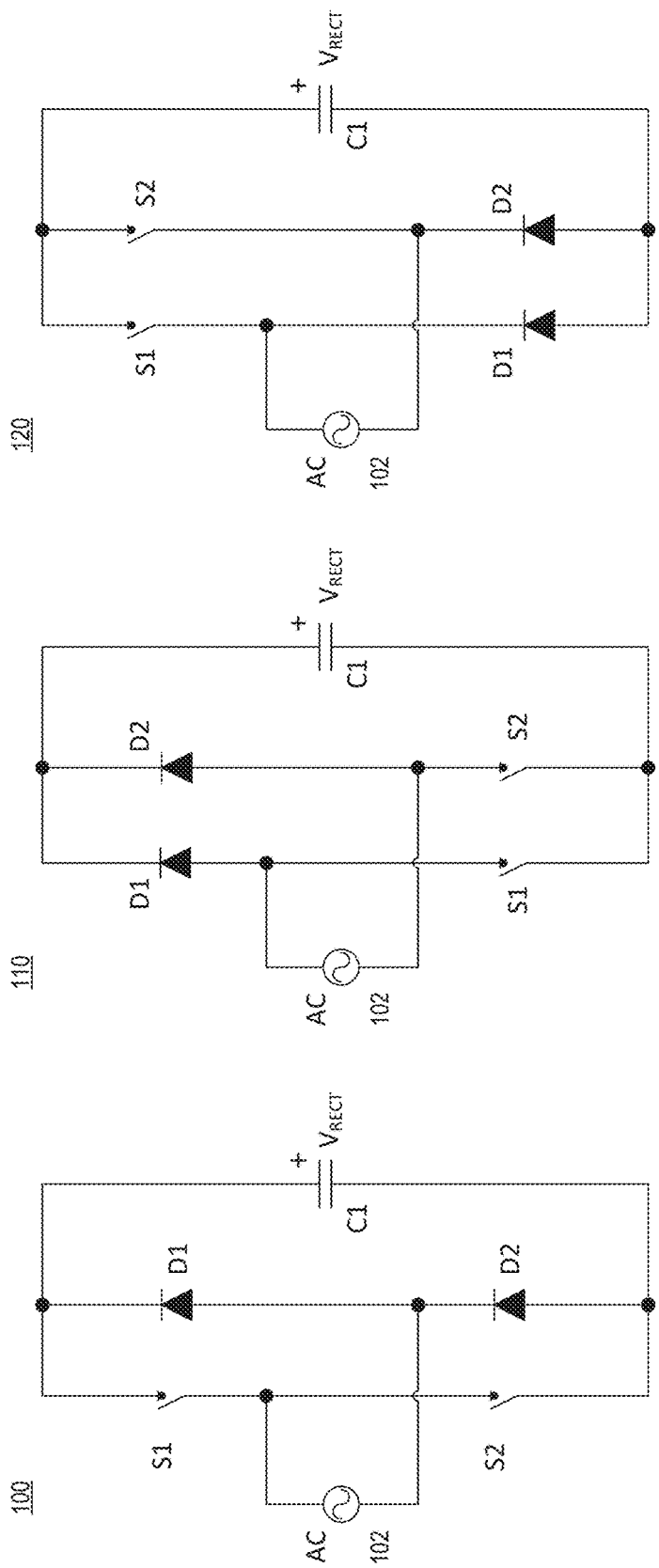
FIG. 1A illustrates a circuit for a bi-directional active rectifying bridge (BARB) in a totem-pole configuration.
FIG. 1B illustrates a circuit for a BARB in a common cathode configuration.
FIG. 1C illustrates a circuit for a BARB in a common anode configuration.

The embodiments described herein provide circuits for bridgeless power converters based upon bi-directional switches. The power converters are configured to convert between alternating current (AC) power and direct current (DC) power. In an AC-to-DC configuration, the AC power is sourced from an AC line voltage (e.g., a mains supply) and is provided to a load that requires a DC voltage. Embodiments of such AC-to-DC power converter configurations are described first. This is followed by descriptions of DC-to-AC power converter configurations, in which DC power supplied by a DC source (e.g., a battery or solar cell) is converted into AC power for use by a load that requires AC power. Furthermore, power converter circuits described herein are capable of supporting both AC-to-DC and DC-to-AC operation, and are capable of operating in both buck (step-down) and boost (step-up) modes.

The described power converters are bridgeless, in that no diode bridge is required for rectification. Instead, for configurations in which AC power is provided from a source, bi-directional switches are used to actively rectify the supplied AC voltage. The bi-directional switches are also used to control the output DC voltage provided to a load. Dependent upon the power converter control and topology, the output DC voltage may be stepped up (boost) or stepped down (buck) relative to a present (instantaneous) voltage level of the input AC voltage. By using the bi-directional switches both for rectification and effectively for DC-to-DC voltage conversion control (e.g., output voltage regulation), a variety of power converter topologies may be realized using minimal circuitry. The minimal circuitry, together with the elimination of any diode bridge, leads to a power converter having low conductivity losses and high efficiency relative to conventional AC-to-DC power converters.

For ease of explanation, the inventions are described by way of particular examples in the context of non-isolated bridgeless power converters, but one skilled in the art will recognize that many of the described techniques are readily extrapolated to isolated power converters having transformers, such as flyback power converters. Circuits corresponding to three different bi-directional active rectifying bridge configurations are described first. One of these configurations, the totem-pole configuration, provides the basis for a bridgeless buck-boost power converter using bi-directional switches, which is described next. The operation of such a power converter is described in detail for different AC-to-DC operational modes, including buck and boost modes. Bridgeless buck boost power converter variations that support both AC-to-DC and DC-to-AC operation are then described, along with the detailed DC-to-AC operation of such a converter.

It should be understood that the particular examples described below are not meant to be limiting. Circuits and techniques that are well-known in the art are not described in detail, so as to avoid obscuring the unique aspects of the invention. Features and aspects from the example embodiments may be combined or re-arranged, except where the context does not allow this.

Bi-Directional Active Rectifying Bridge (BARB) Configurations

FIGS. 1A, 1B, and 1C illustrate, respectively, totem-pole 100, common cathode 110, and common anode 120 BARB configurations. Each of these configurations 100, 110, 120 includes two diodes D1, D2 and two bi-directional switches S1, S2. In some cases, the diodes D1, D2 may be replaced with switches, which need not be bi-directional, so as to reduce conductivity losses and/or to achieve zero voltage switching (ZVS). Relative to a conventional rectification bridge consisting of four diodes, the BARB circuit configurations 100, 110, 120 use bi-directional switches S1, S2 rather than two of the diodes; the specific diodes that are replaced varies among the three configurations. Because the BARB circuits perform active rectification, they have an advantage over diode bridges in that BARB circuits can actively stop rectification. This requires that the switches S1, S2 within the BARB configurations are bi-directional, such that each of these switches S1, S2 can block conductivity in either direction. Another advantage of these BARB circuits is that the conductivity losses of the bi-directional switches S1, S2 is typically lower than that of the diodes that would be used in a diode bridge. This leads to improved power efficiency of the BARB circuits relative to rectifiers based upon diode bridges.

Each of the three BARB circuit configurations 100, 110, 120 includes the same circuit components and is fundamentally equivalent. An AC voltage source 102 supplies power to each of the BARB circuits 100, 110, 120. By appropriately controlling the bi-directional switches S1, S2, a rectified voltage $V_{RECT}$ is provided across a capacitor C1 and a load (not shown for ease of illustration). In addition to their usage for rectifying the AC voltage, the bi-directional switches S1, S2 may also be used as control switches for a switching power converter. By incorporating one or more energy-storage components, e.g., inductors, capacitors, magnetics, and using the bi-directional switches S1, S2 to control power transfer, the BARB circuits 100, 110, 120 may be transformed into switching power converters. While any of the illustrated BARB circuits 100, 110, 120 are able to rectify an AC voltage, some power converter topologies can only use one or two of the BARB configurations due to the topology requirements of the power converter itself. Stated alternatively, a chosen power converter topology will often determine which BARB circuit configuration(s) is feasible and/or optimal. While not illustrated, note that each of the three BARB circuit configurations may be inverted such that the common ground is on the high side and the diode directions are reversed. Such configurations may be preferred for some power converter topologies.

Rectification operation for the totem-pole BARB configuration 100 will now be described using the circuits 100p, 100n of FIGS. 2 and 3. Operation of the common cathode and common anode configurations is not explicitly described, but can be readily extrapolated from the description of the totem-pole circuit operation.

Figure 2:
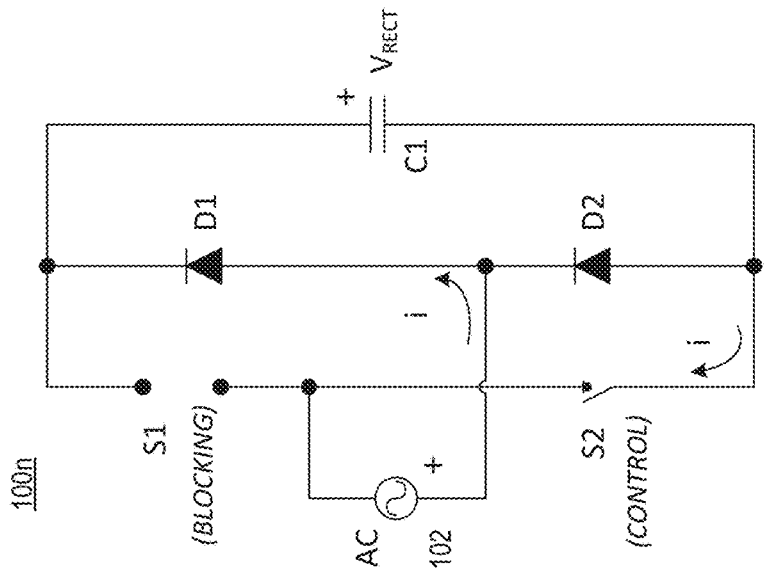
FIGS. 2 and 3 illustrate rectifying operation for a BARB circuit having a totem-pole configuration.

FIG. 2 illustrates the totem-pole BARB configuration 100p for a scenario in which the supplied AC voltage is in a positive half cycle. The second bi-directional switch S2 is turned off such that it blocks any current flow through it. The second bi-directional switch S2 becomes electrically equivalent to an open circuit, as shown. The first bi-directional switch S1 is used to control the power flow through the BARB circuit 100p. With the first bi-directional switch S1 conducting, positive current, denoted i within FIG. 2, flows from the AC voltage supply 102, through the first bi-directional switch S1, through a load (not illustrated), and through the second diode D2. If the BARB circuit 100 is merely performing rectification, the first bi-directional switch S1 would remain closed throughout the interval when the AC voltage is positive. If the BARB circuit 100 is part of a switching power converter, then the first bi-directional switch S1 controls the power flow from the AC power source 102 to a load (not illustrated) of the power converter. This is accomplished by supplying a control signal to the first bi-directional switch S1. For example, a pulse-width-modulated (PWM) waveform may be supplied to the gate(s) of the first bi-directional switch S1, wherein the frequency and/or duty cycle of the PWM waveform determines the rate of energy transfer. A controller (not shown for ease of illustration) generates control signals (e.g., the PWM waveform) for the bi-directional switches S1, S2 based upon a measured voltage of the AC power source 102.

Figure 3:
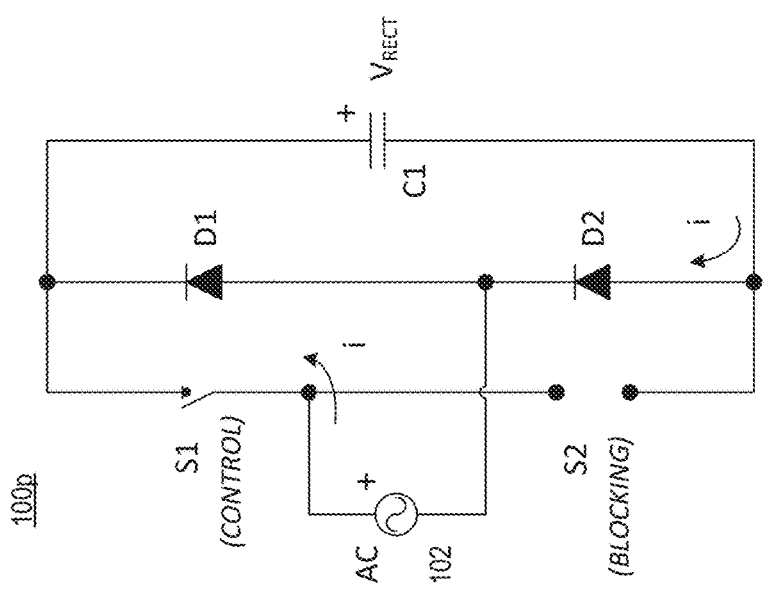

FIG. 3 illustrates a corresponding scenario for the totem-pole BARB configuration 100n when the supplied AC voltage is in a negative half cycle. The functionality of the first and second bi-directional switches S1, S2 are swapped. The first bi-directional switch S1 blocks any current flow (is open circuited), whereas the second bi-directional switch S2 becomes the controlling switch. Positive current, denoted i within FIG. 3, flows from the AC voltage supply 102 through the first diode D1, through the load (not illustrated) and through the second bi-directional switch S2. As similarly explained above for the positive half cycle, the second bi-directional switch S2 may control the power flow from the AC power source 102 to the load, if the BARB circuit 100 is part of a switching power converter. A control signal will be provided to the second bi-directional switch S2, in a manner similar to that described above regarding control of the first bi-directional switch S1 when the AC source is supplying positive voltage.

BARB Totem-Pole Buck Boost Power Converter

Figure 4:
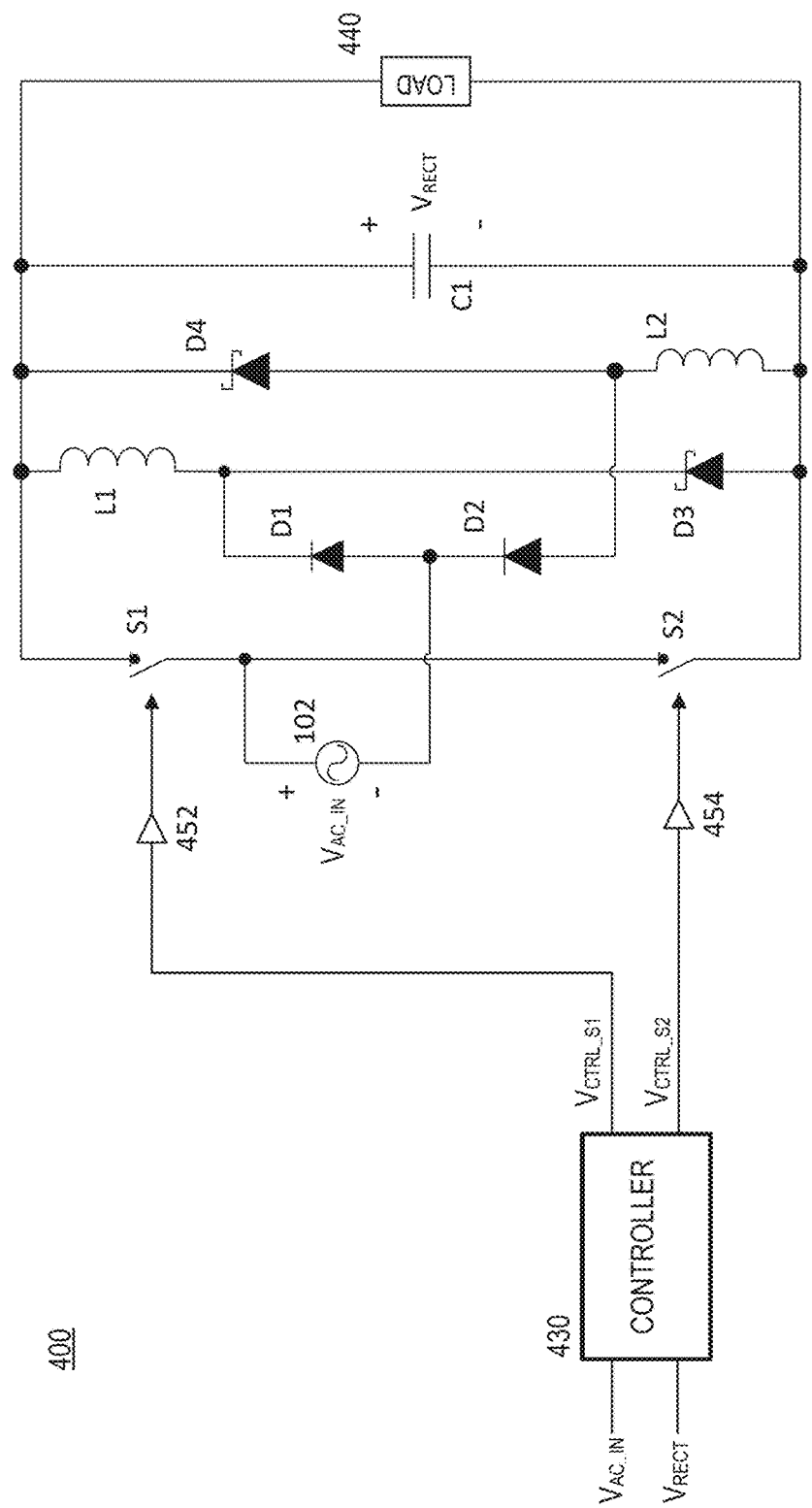
FIG. 4 illustrates a buck boost power converter circuit using a totem-pole BARB.
Figure 5A:
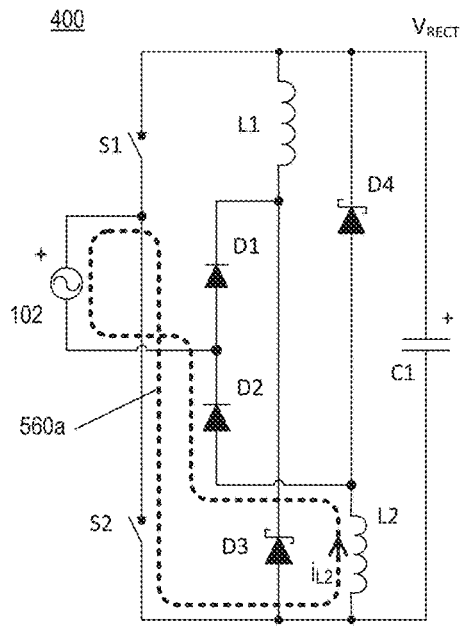
FIGS. 5A-5D illustrate conduction paths through a buck boost power converter when the power converter is operating as an AC-to-DC converter in boost mode.
Figure 5B:
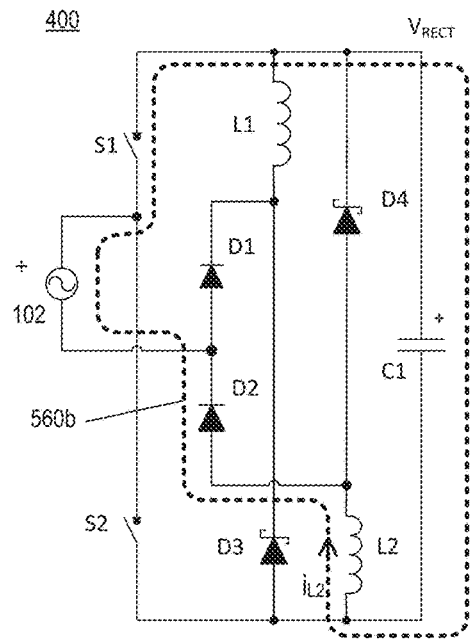
Figure 5C:
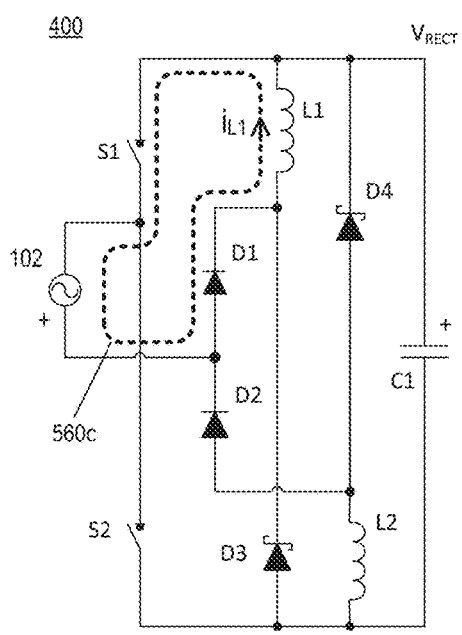
Figure 5D:
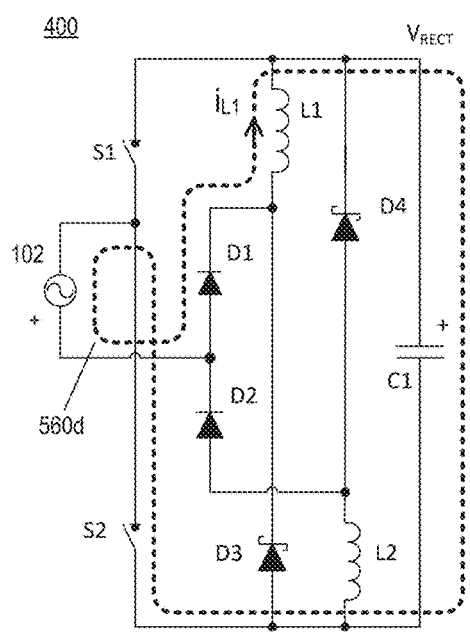
Figure 6A:
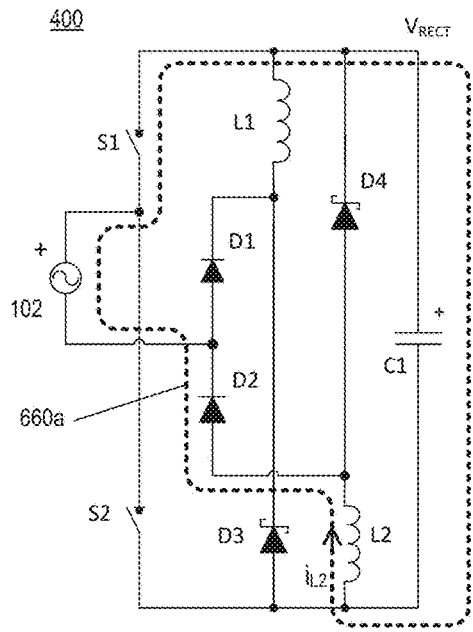
FIGS. 6A-6D illustrate conduction paths through a buck boost power converter when the power converter is operating as an AC-to-DC converter in buck mode.
Figure 6B:
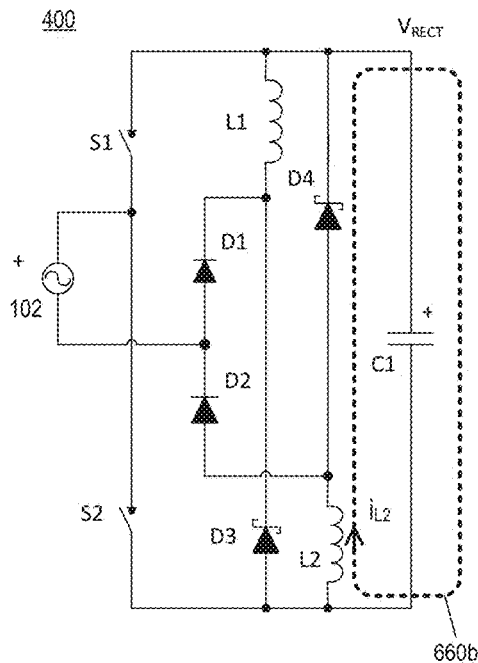
Figure 6C:
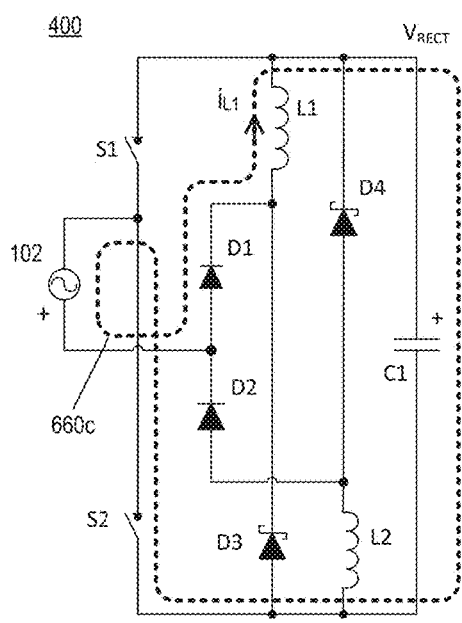
Figure 6D:
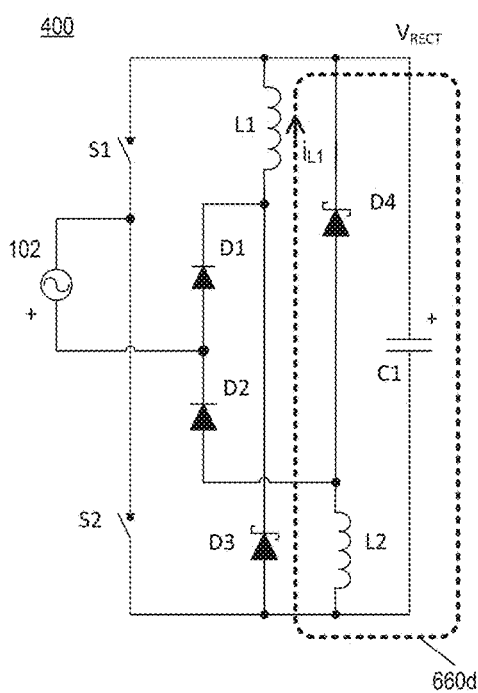

FIG. 4 illustrates a power converter 400 based upon the totem-pole BARB configuration and capable of operating in either a buck (step down) or boost (step up) mode. This buck boost power converter circuit 400 is configured similarly to the totem-pole BARB configuration 100 of FIG. 1A, but additionally includes a first inductor L1 in series with the first diode D1, and a second inductor L2 in series with the second diode D2. This circuit 400 further includes third and fourth diodes D3, D4, which, for some cases, allow the current flow to bypass one of the inductors and which reduces the number of diodes in the current conduction path. By minimizing the number of diodes and inductors that current must flow through, conductivity losses are minimized leading to good efficiency of the power converter 400. As explained further below, the conductivity losses may be additionally improved by replacing diodes within the power converter 400 with other current-blocking devices, such as synchronous rectification (SR) switches. Before describing such improvements, the operation of the power converter 400 will be described for boost and buck operational modes.

An AC power supply 102 provides an AC voltage $V_{AC\_IN}$ to the buck boost converter circuit 400, which outputs a rectified (DC) voltage $V_{RECT}$. The DC voltage $V_{RECT}$ supplies power to a load 440. A controller 430 generates signals $V_{CTRL\_S1}$, $V_{CTRL\_S2}$ for controlling, via drivers 452, 454, the bi-directional switches S1, S2, based upon the input AC voltage $V_{AC\_IN}$ and the output DC voltage $V_{RECT}$. Control of the bi-directional switches S1, S2 will now be described.

The AC voltage $V_{AC\_IN}$ and the DC voltage $V_{RECT}$ are measured (sensed) and provided to the controller 430. In typical operation, the controller 430 will use these measured voltages to generate the switch control signals $V_{CTRL\_S1}$, $V_{CTRL\_S2}$ so as to maintain the output DC voltage $V_{RECT}$ near a target (reference) voltage $V_{REF}$. The switch control signals $V_{CTRL\_S1}$, $V_{CTRL\_S2}$ are typically pulse-width-modulated (PWM) waveforms, and the output DC voltage $V_{RECT}$ is determined by the frequency and/or duty cycle of these PWM waveforms. For an example scenario, when using a fixed frequency PWM waveform, if the output DC voltage $V_{RECT}$ drops below the reference voltage $V_{REF}$, the duty cycle of the PWM waveform driving a control switch may be increased to increase energy transfer through the power converter 400. Conversely, for such an example, if the output DC voltage $V_{RECT}$ rises above the reference voltage $V_{REF}$, the duty cycle of the PWM waveform driving a control switch may be decreased. Because the input voltage $V_{AC\_IN}$ is time varying, updates to the PWM duty cycle or frequency are also compensated by the magnitude of the measured input voltage $V_{AC\_IN}$ for any given point in time. Control techniques, such as proportional-integral-derivative (PID) control, for generating and modifying the duty cycle or frequency of PWM signals used for controlling switches within power converters are well-known in the art and, hence, will not be further detailed herein.

The controller 430 uses the polarity of the AC voltage $V_{AC\_IN}$, the magnitude of the AC voltage $V_{AC\_IN}$, and the DC voltage $V_{RECT}$ to determine an operational mode for the power converter 400. Different operational modes are needed when the AC voltage $V_{AC\_IN}$ is positive vs. when it is negative, as may be determined from the polarity of the AC voltage $V_{AC\_IN}$. Additionally, different control is required for operating in boost mode vs. buck mode, as may be determined from the magnitude of the AC voltage $V_{AC\_IN}$ as compared with the DC voltage $V_{RECT}$. Further detail regarding these operational modes is provided in FIGS. 5A-5D, FIGS. 6A-6D, and their respective descriptions below.

The controller 430 and its constituent parts may be implemented using a combination of analog hardware components (such as transistors, amplifiers, diodes, resistors, analog-to-digital converters), and processor circuitry that includes primarily digital components. The processor circuitry may include one or more of a digital signal processor (DSP), a general-purpose processor, and an application-specific integrated circuit (ASIC). The controller 430 may also include memory, e.g., non-volatile memory such as flash, that includes instructions or data for use by the processor circuitry, and one or more timers. Such memory may store values for the reference voltage $V_{REF}$. The controller 430 inputs sensor signals such as signals corresponding to the voltage $V_{AC\_IN}$ and the DC voltage $V_{RECT}$, and generates signals $V_{CTRL\_S1}$, $V_{CTRL\_S2}$ for controlling the bi-directional switches S1, S2 within the power converter 400.

FIGS. 5A-5D illustrate current flows 560a, 560b, 560c, 560d for the power converter 400 when it is operating in boost mode. For ease of illustration, the controller 430, the drivers 452, 454, and the load 440 are not shown in FIGS. 5A-5D, but it should be understood that these components are actually part of the circuit 400, as described in relation to FIG. 4. Note, in particular, that the current flows 560b, 560d of FIGS. 5B and 5D would pass through the load 440, though the load 440 is not shown for ease of illustration.

When the controller 430 detects that a present (e.g., instantaneous) voltage $V_{AC\_IN}$ measured across the AC voltage source 102 is positive, the controller 430 controls the bi-directional switches S1, S2 by alternating which of these switches S1, S2 conducts. (There may additionally be a dead-time in which neither switch conducts, so as to prevent damage to the switches. The switches never conduct at the same time.) For a first positive interval, the second bi-directional switch S2 is set to conduct while the first bi-directional switch S1 is set to block current flow. The resulting current flow is shown in the current path 560a of FIG. 5A. The second inductor L2 is energized by the current flow $i_{L2}$ through it. For a second positive interval, the first bi-directional switch S1 is set to conduct while the second bi-directional switch S2 is set to block current flow. The resulting current flow is shown in the current path 560b of FIG. 5B. As the current flow $i_{L2}$ decreases during this interval and the second inductor L2 de-energizes, a voltage induced across the second inductor L2 adds to the present voltage $V_{AC\_IN}$ across the AC power source 102. The resultant DC voltage $V_{RECT}$ is, thus, higher than the present voltage $V_{AC\_IN}$ across the AC power source 102, i.e., the power converter 400 is operating in a boost mode. The amount of boost is determined from the duty cycle of the PWM control signal $V_{CTRL\_S2}$ that controls the second bi-directional switch S2, i.e., the ratio of the first positive interval to the overall period given by the sum of the first positive interval, the second positive interval, and any dead time in which neither switch is conducting. Techniques for generating such PWM control signals to provide a DC output voltage, e.g., $V_{RECT}$, that is maintained near a reference voltage $V_{REF}$ are well-known within the control of boost converters, and will not be further detailed herein.

When the controller 430 detects that a present (e.g., instantaneous) voltage $V_{AC\_IN}$ measured across the AC voltage source 102 is negative, the controller 430 controls the bi-directional switches S1, S2 in a manner opposite to that described above for a positive AC voltage, and the first inductor L1 is used as the energy-storage device. For a first negative interval, the first bi-directional switch S1 is set to conduct while the second bi-directional switch S2 is set to block current flow. The resulting current flow is shown in the current path 560c of FIG. 5C. The first inductor L1 is energized by the current flow $i_{L1}$ through it. For a second negative interval, the second bi-directional switch S2 is set to conduct while the first bi-directional switch S1 is set to block current flow. The resulting current flow is shown in the current path 560d of FIG. 5D. As the current flow $i_{L1}$ decreases during this interval and the first inductor L1 de-energizes, a voltage induced across the first inductor L1 adds to the present voltage $V_{AC\_IN}$ across the AC power source 102. The resultant DC voltage $V_{RECT}$ is, thus, higher than the magnitude of the present voltage $V_{AC\_IN}$ across the AC power source 102, i.e., the power converter 400 is operating in a boost mode. The amount of boost is determined from the duty cycle of the PWM control signal $V_{CTRL\_S1}$ that controls the first bi-directional switch S1, i.e., the ratio of the first negative interval to the overall period given by the sum of the first negative interval, the second negative interval, and any dead time in which neither switch is conducting.

FIGS. 6A-6D illustrate current flows 660a, 660b, 660c, 660d for the power converter 400 when it is operating in buck mode. For ease of illustration, the controller 430, the drivers 452, 454, and the load 440 are not shown in FIGS. 6A-6D, but it should be understood that these components are actually part of the circuit 400, as described in relation to FIG. 4. Note, in particular, that the current flows 660a, 660b, 660c, 660d of FIGS. 6A-6D pass through the load 440, though the load 440 is not explicitly shown.

When the controller 430 detects that a present (e.g., instantaneous) voltage $V_{AC\_IN}$ measured across the AC voltage source 102 is positive, the controller 430 sets the second bi-directional switch S2 as a blocking (open) switch and uses the first bi-directional switch S1 to control the power flow through the converter 400. For a first positive interval, the first bi-directional switch S1 is set to conduct, thereby resulting in the current flow path 660a of FIG. 6A. The second inductor L2 is energized by the current flow $i_{L2}$ through it. Furthermore, a voltage induced across the second inductor L2 is counter to the voltage $V_{AC\_IN}$ across the voltage source 102, meaning that the DC voltage $V_{RECT}$ is stepped down relative to the present (e.g., instantaneous) voltage $V_{AC\_IN}$ provided by the voltage source 102. For a second positive interval, the first bi-directional switch S1 is turned off, thereby resulting in the current flow path 660b of FIG. 6B. As the current flow $i_{L2}$ decreases during this interval and the second inductor L2 de-energizes, a voltage is induced across the second inductor L2 and powers the load 440 (not illustrated). For this second positive interval, the DC voltage $V_{RECT}$ is also lower than that of the present (e.g., instantaneous) voltage $V_{AC\_IN}$ provided by the voltage source 102. The amount of the voltage decrease is determined from the duty cycle of the PWM control signal $V_{CTRL\_S1}$ that controls the first bi-directional switch S1, i.e., the ratio of the first positive interval to the overall period given by the sum of the first positive interval and the second positive interval. Techniques for generating such PWM control signals to provide a DC output voltage, e.g., $V_{RECT}$, that is maintained near a reference voltage $V_{REF}$ are well-known within the control of buck converters, and will not be further detailed herein.

When the controller 430 detects that a present (e.g., instantaneous) voltage $V_{AC\_IN}$ measured across the AC voltage source 102 is negative, the controller 430 effectively swaps its usage of the first and second bi-directional switches S1, S2, and the first inductor L1 is used as the energy-storage device. In particular, the first bi-directional switch S1 is set to block current flow, and the second bi-directional switch S2 controls the power flow through the converter 400. For a first negative interval, the second bi-directional switch S2 is set to conduct, thereby resulting in the current flow path 660c of FIG. 6C. The first inductor L1 is energized by the current flow $i_L u$ through it, thereby inducing a voltage across the first inductor L1 that is counter to the voltage $V_{AC\_IN}$ across the voltage source 102. This means that the DC voltage $V_{RECT}$ is stepped down relative to the magnitude of the present (e.g., instantaneous) voltage $V_{AC\_IN}$ provided by the voltage source 102. For a second positive interval, the second bi-directional switch S2 is turned off, thereby resulting in the current flow path 660d of FIG. 6D. As the current flow $i_{L1}$ decreases during this interval and the first inductor L1 de-energizes, a voltage induced across the first inductor L1 powers the load 440 (not illustrated). For this second negative interval, the DC voltage $V_{RECT}$ is also lower than that of the magnitude of the present (e.g., instantaneous) voltage provided by the voltage source 102. The amount of the voltage decrease is determined from the duty cycle of the PWM control signal $V_{CTRL\_S2}$ that controls the second bi-directional switch S2, i.e., the ratio of the first negative interval to the overall period given by the sum of the first and second negative intervals.

Figure 7:
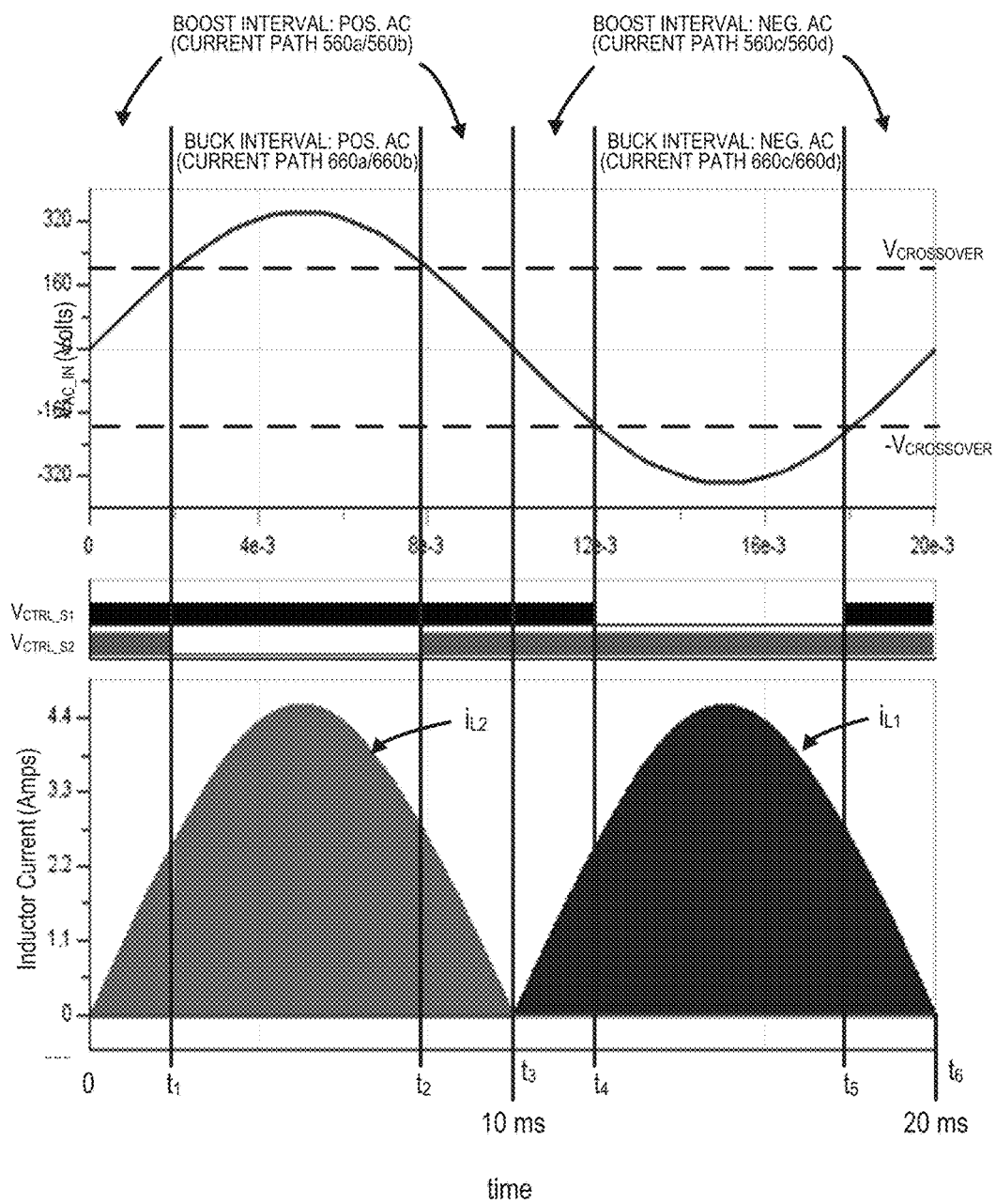
FIG. 7 illustrates waveforms for an input AC voltage, switch control signals, and inductor currents for a buck boost power converter using a totem-pole BARB.

FIG. 7 illustrates waveforms for an input AC voltage, switch control signals, and inductor currents for the buck boost converter 400 of FIG. 4. These waveforms illustrate how the power converter 400 transitions between buck and boost operational modes during a cycle of the AC voltage provided by the AC voltage source 102. The illustrated AC voltage $V_{AC\_IN}$ varies over time, has a period of 20 ms which corresponds to a frequency of 50 Hz, and has a peak voltage of approximately 325 V, as is typical for power being sourced from a mains supply.

The controller 430 detects whether, at a particular time, the voltage $V_{AC\_IN}$ across the AC voltage source 102 is positive or negative. For the time interval between 0 and $t_3$, the controller 430 would classify the voltage $V_{AC\_IN}$ as being positive, whereas the controller 430 would classify the voltage $V_{AC\_IN}$ as negative for the time interval between times $t_3$ and $t_6$. This polarity may be detected by an analog comparator (not illustrated) that is within or outside of the controller 430. More typically, an analog-to-digital converter (ADC) will digitize the voltage $V_{AC\_IN}$ at discrete points in time, thereby providing digital samples of the voltage $V_{AC\_IN}$ that may be used by the controller 430 to determine whether the voltage $V_{AC\_IN}$ is positive or negative. Such an ADC, which is not shown for ease of illustration, may be part of or separate from the controller 430.

The power converter 400 may be operated solely in a buck mode or solely in a boost mode. However, in addition to performing rectification and requiring minimal circuitry, a significant advantage of the power converter 400 is that it can dynamically change between buck and boost operation. The waveforms of FIG. 7 illustrate a scenario in which a DC voltage $V_{RECT}$ output by the power converter 400 has a target reference voltage $V_{REF}$ (e.g., 180V) that is moderately above 0V and moderately below the peak voltage of 325V provided by the AC voltage source 102. Maintaining such a DC output voltage $V_{RECT}=V_{REF}$ is advantageously accomplished using both buck and boost operation.

The controller 430 senses (measures), at a particular time, a magnitude of the voltage $V_{AC\_IN}$ across the AC voltage source 102. If this voltage magnitude $|V_{AC\_IN}|$ is higher than the desired output DC voltage $V_{RECT}=V_{REF}$, the controller 430 operates in buck mode and, otherwise, the controller 430 operates in boost mode. Typically, an ADC (not shown for ease of illustration) will digitize the voltage $V_{AC\_IN}$ at discrete points in time, thereby providing digital samples of the voltage $V_{AC\_IN}$ that may be used by the controller 430 to determine whether the voltage magnitude $|V_{AC\_IN}|$ indicates that buck or boost mode should be used.

During the time intervals between 0 and $t_1$, and between $t_2$ and $t_3$, the voltage $V_{AC\_IN}$ is positive and its magnitude is low enough (e.g., below a threshold voltage $V_{CROSSOVER}$ associated with the target reference voltage $V_{REF}$) that boost mode is indicated. Upon detecting that the voltage $V_{AC\_IN}$ is within such a range, the controller 430 switches the bi-directional switches S1, S2 to implement boost mode operation. Such operation is detailed above in the description of the current flow paths 560a, 560b of FIGS. 5A and 5B. As shown in the switch control waveforms $V_{CTRL\_S1}$, $V_{CTRL\_S2}$ of FIG. 7, the bi-directional switches S1, S2 are both actively switched during these intervals. (While not evident due to the time scale of FIG. 7, the switch control waveforms $V_{CTRL\_S1}$, $V_{CTRL\_S2}$ are PWM waveforms and are never both high at the same time.) FIG. 7 also shows that current $i_{L2}$ flows through the second inductor L2 during these intervals, but does not flow through the first inductor L1. (Also not evident due to the time scale of FIG. 7, the current $i_{L2}$ through the second inductor L2 comprises a series of triangularly-shaped current excursions from zero, as is characteristic for inductor current in a boost converter. The half sinusoid shown in FIG. 7 corresponds to the peaks of these triangles and, thus, shows the envelope of a series of current excursions that are each triangularly-shaped.)

During the interval between times $t_1$ and $t_2$, the voltage $V_{AC\_IN}$ is positive and its magnitude is high enough (e.g., above a threshold voltage $V_{CROSSOVER}$ associated with the target reference voltage $V_{REF}$) that buck mode is indicated. Upon detecting that the voltage $V_{AC\_IN}$ is within such a range, the controller 430 turns off the second bi-directional switch S2, by setting its control signal $V_{CTRL\_S2}$ low, and switches the first bi-directional switch S1 to implement buck mode operation. Such operation is detailed above in the description of the current flow paths 660a, 660b of FIGS. 6A and 6B. As shown in the switch control waveforms $V_{CTRL\_S1}$, $V_{CTRL\_S2}$ of FIG. 7, only the first bi-directional switch S1 is actively switched during this interval. (While not evident due to the time scale of FIG. 7, the switch control waveform $V_{CTRL\_S1}$ is a PWM waveform.) FIG. 7 also shows that current $i_{L2}$ flows through the second inductor L2 during this interval, but does not flow through the first inductor L1. (Also not evident due to the time scale of FIG. 7, the current $i_{L2}$ through the second inductor L2 comprises a series of triangularly-shaped current excursions from zero, as is characteristic for inductor current in a buck converter. The half sinusoid shown in FIG. 7 corresponds to the peaks of these triangles, and thus shows the envelope of a series of current excursions that are each triangularly-shaped.)

Operation of the controller 430 when the voltage $V_{AC\_IN}$ across the AC source 102 is negative is largely the same as described above for positive voltage $V_{AC\_IN}$, except that the PWM waveforms used for controlling the first and second bi-directional switches S1, S2 are swapped, and the first inductor L1 is used for energy storage rather than the second inductor L2. More particularly, boost mode is used during the intervals between times $t_3$ and $t_4$, and between times $t_5$ and $t_6$, as detailed above in the description of the current flow paths 560c, 560d of FIGS. 5C and 5D. Likewise, buck mode is used during the interval between times $t_4$ and $t_5$, as detailed above in the description of the current flow paths 660c, 660d of FIGS. 6C and 6D.

Bi-Directional Switch Types and Diode Types

The bi-directional switches S1, S2 used in the BARB circuits and power converters of FIGS. 1-6 are capable of conducting current in both directions and of blocking current in both directions. Such a bi-directional switch may be created by placing two transistors, e.g., MOSFETs, back-to-back in series. However, a significant advantage of the power converters disclosed herein is realized when the bi-directional switches S1, S2 are each singular devices, as such devices have conductivity advantages over multiple back-to-back switches.

Figure 8:
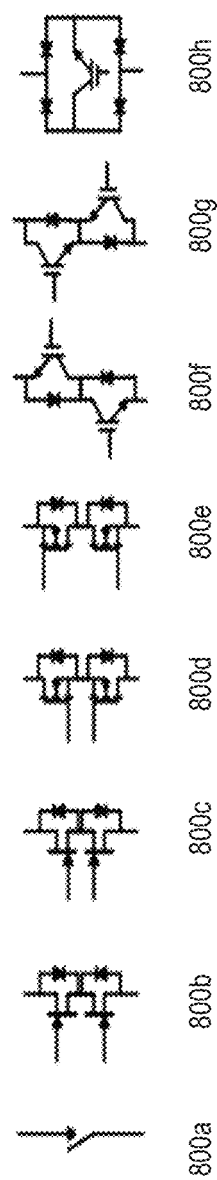
FIG. 8 illustrates different types of bi-directional switches.

FIG. 8 illustrates several such bi-directional switches. A technology-independent bi-directional switch 800a is shown for the first and second bi-directional switches S1, S2 illustrated in FIGS. 1-6. In a preferred embodiment, these switches S1, S2 are gallium nitride (GaN) high-electron-mobility transistors (HEMTs) with two gates that share a common drift region. By employing a common drift region, the conductivity of a bi-directional switch is half that of two transistors coupled to each other in series and constructed of the same technology. GaN HEMTs having a common drain 800b and GaN HEMTs having a common source 800c are illustrated in FIG. 8. Each of the bi-directional switches may also be a MOSFET with a common source 800d or a MOSFET with a common drain 800e. Furthermore, these bi-directional switches may each be an insulated gate bipolar transistor (IGBT) having a common collector 800f or an IGBT having a common emitter 800g. Yet further, the bi-directional switches may each be a discrete IGBT with bridge diodes 800h, as illustrated in FIG. 8. For a bi-directional switch having, e.g., two gates or two bases, the gates or bases are preferably tied together and provided at a common terminal, such that a single switch control signal may be used for controlling the bi-directional switch.

The power converter 400 of FIG. 4 includes diodes D1 and D3, which limit the current through the first inductor L1 to only flow in a single direction. Similarly, the diodes D2 and D4 limit the current through the second inductor L2 to only flow in a single direction. Note that the diodes D1 and D2 only change state (between conduction and blocking) when the polarity of the voltage $V_{AC\_IN}$ across the AC voltage source 102 changes. This occurs quite slowly (e.g., at a 100 Hz rate for a mains voltage with a 50 Hz frequency or at a 120 Hz rate for a mains voltage with a 60 Hz frequency), so the diodes D1 and D2 may be fairly slow-acting. In a further embodiment of the power converter 400 of FIG. 4, the diodes D1, D2 may be replaced with synchronous rectification (SR) switches. These SR switches need not be particularly fast, and do not need to be capable of blocking current flow in both directions as the bi-directional switches S1, S2 do.

Figure 9:
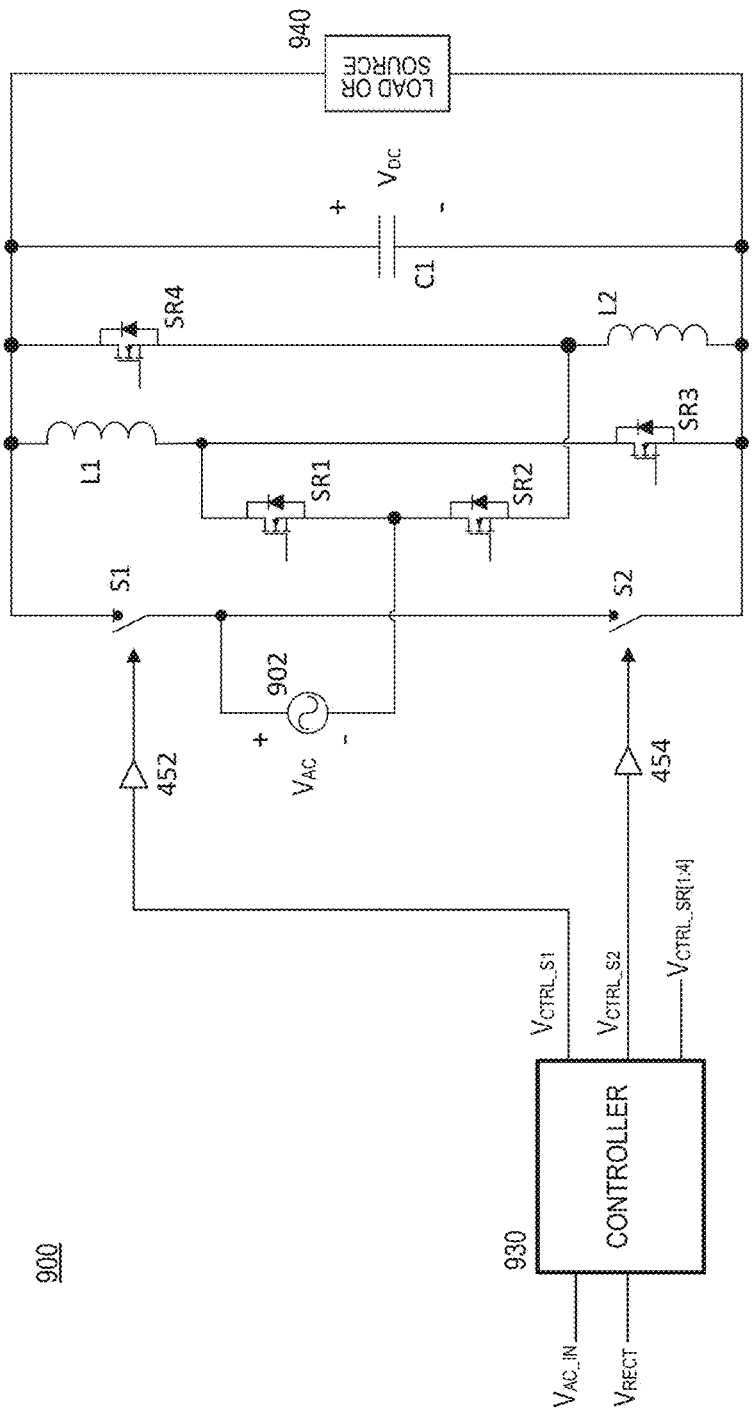
FIG. 9 illustrates a buck boost power converter circuit using a totem-pole BARB and which can convert from AC to DC and from DC to AC.

FIG. 9 illustrates a power converter 900 using SR switches SR1, SR2 in place of the diodes D1, D2 of the power converter 400. Preferably and for the AC-to-DC conversion as described thus far, control signals $V_{CTRL\_SR1}$, $V_{CTRL\_SR2}$ generated by the controller 930 are used to actively block current in the same way that the diodes D1, D2 did. When a voltage $V_{AC}$ provided by a voltage source 902 is positive, the second SR switch SR2 is set to conduct and the first SR switch SR1 is turned off. Otherwise, the first SR switch SR1 is set to conduct and the second SR switch SR2 is turned off. Because the conductivity of the SR switches SR1, SR2, when they are set for conduction, is typically better than the conductivity of the diodes D1, D2, use of the SR switches SR1, SR2 leads to lower losses and improved efficiency.

The controller 930 generates the control signals $V_{CTRL\_SR1}$, $V_{CTRL\_SR2}$ based upon a measurement of the voltage $V_{AC}$ across the AC voltage source 902. These control signals $V_{CTRL\_SR1}$, $V_{CTRL\_SR2}$ are coupled, via drivers, to control terminals (e.g., gates) of the SR switches SR1, SR2. (For ease of illustration, neither the drivers nor the control terminal connections are illustrated in FIG. 9.) As described previously for FIGS. 5-6, the polarity of this voltage is already determined for other purposes. The controller 930 uses this voltage polarity to turn on one of the SR switches SR1, SR2, and to turn the other one off. (Due to the body diode of the MOSFETs, the SR switches will actually provide the required current flow without any active control. However, the active control of these switches improves their conductivity, as is preferred.) As illustrated, the SR switches SR1, SR2 are MOSFETs, but other switch types may be preferred for some applications.

The third and fourth diodes D3 and D4 are fast acting, unlike the diodes D1, D2 or the SR switches SR1, SR2. More particularly, these diodes D3 and D4 change states with a similar frequency as the bi-directional control switches S1, S2. In FIG. 4, these diodes D3, D4 are silicon carbide (SiC) Schottky diodes, as such diodes are both efficient and fast-acting.

In the power converter 900 of FIG. 9, SR switches SR3, SR4 have replaced the diodes D3 and D4. By appropriately controlling the conduction of these SR switches SR3, SR4, the conductivity losses through these devices may be reduced relative to the conductivity losses of the diodes D3 and D4, while still blocking current flow as needed. The controller 930 generates control signals $V_{CTRL\_SR3}$, $V_{CTRL\_SR4}$ and drives control terminals (e.g., gates) of the SR switches SR3, SR4, via drivers. (For ease of illustration, neither the drivers nor the control terminal connections are illustrated in FIG. 9.) More particularly, the SR switches SR3, SR4 should be set, respectively, to conduct during the buck intervals associated with the current flow paths 660d, 660b of FIGS. 6D and 6B. The diodes and SR switches described above are considered current-blocking devices, in that they are capable of blocking current flow in at least one direction. While such current-blocking devices may be capable of blocking current flow in both directions, as the bi-directional switches do, this is not required for current-blocking devices.

DC-to-AC Power Conversion

As explained above, the use of SR switches SR1, SR2, SR3, SR4 rather than diodes provides reduced conductivity losses through these current-blocking devices, when the power converter 900 is operating as an AC-to-DC converter. The use of active switches also enables the power converter circuit 900 to be able to operate as a DC-to-AC converter (inverter), i.e., to convert DC power provided from a source 940 into AC power required by an AC load 902. (Relative to the power converter 400 of FIG. 4, note that the AC source 102 has become an AC load 902, and that the DC load 440 has become a DC source 940.) Because the circuit of the power converter 900 is similar to the circuit of the power converter 400 and because the control for DC-to-AC conversion is largely opposite to the control described previously for AC-to-DC conversion, DC-to-AC control will be only briefly described. This operation will be described in conjunction with FIGS. 10A-10D and 11A-11D. For ease of illustration, those figures do not show the controller 930, drivers 452, 454, or drivers for the active switch control signals, or the DC source 940.

Figure 10A:
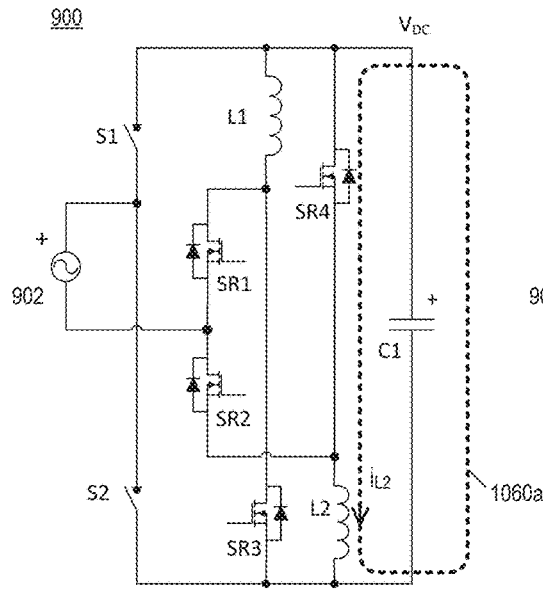
FIGS. 10A-10D illustrate conduction paths through a buck boost power converter when the power converter is operating as a DC-to-AC converter in boost mode.
Figure 10B:
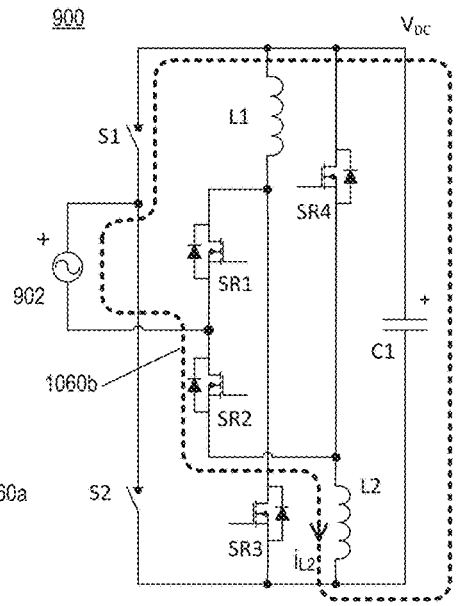

FIGS. 10A and 10B illustrate current flow paths 1060a, 1060b for a boost mode wherein the DC source 940 is stepped up to provide a positive voltage $V_{AC}$ at the AC load 902. The second inductor L2 is used as an energy-storage device during this boost mode. The controller 930 sets the control signals for the bi-directional switch S1 and the active switches SR2, SR4 so as to alternate between the current paths 1060a, 1060b of FIGS. 10A and 10B, and generate a desired voltage at the AC load 902. (Bi-directional switch S2 and active switch SR1 are turned off during the boost mode with positive voltage $V_{AC}$ at the AC load 902.)

Figure 10C:
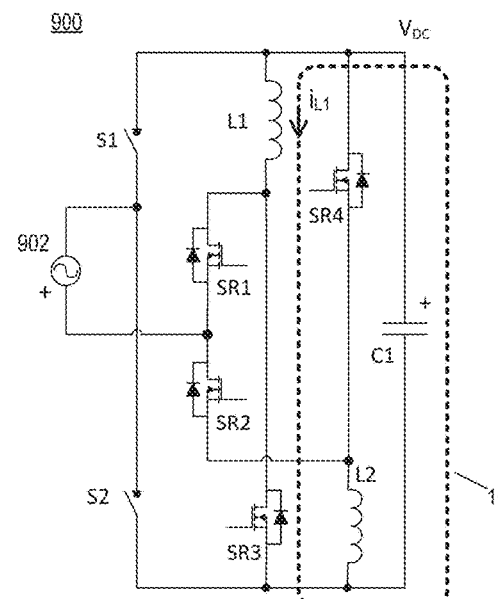
Figure 10D:
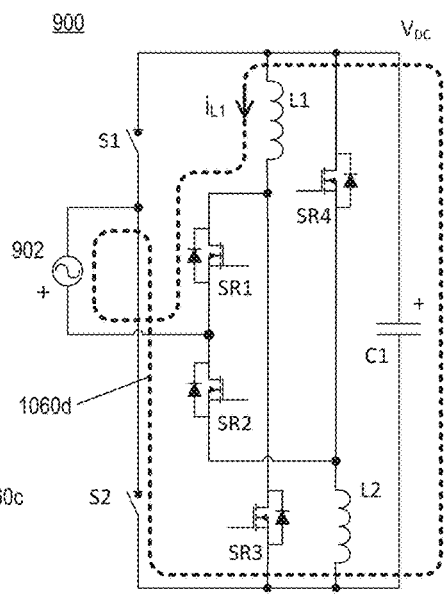

FIGS. 10C and 10D illustrate current flow paths 1060c, 1060d for a boost mode wherein the DC source 940 is stepped up in magnitude and provides a negative voltage $V_{AC}$ at the AC load 902. The first inductor L1 is used as an energy-storage device during this boost mode. The controller 930 sets the control signals for the bi-directional switch S2 and the active switches SR1, SR3 so as to alternate between the current paths 1060c, 1060d of FIGS. 10C and 10D, and generate a desired (negative) voltage at the AC load 902. (Bi-directional switch S1 and active switch SR4 are turned off during the boost mode with negative voltage $V_AC$ at the AC load 902.)

Figure 11A:
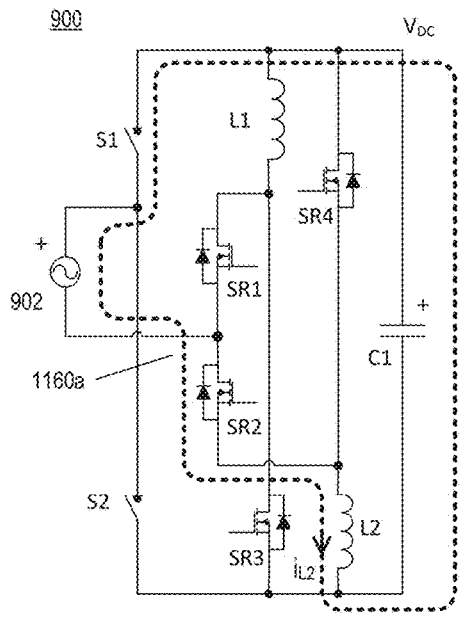
FIGS. 11A-11D illustrate conduction paths through a buck boost power converter when the power converter is operating as a DC-to-AC converter in buck mode.
Figure 11B:
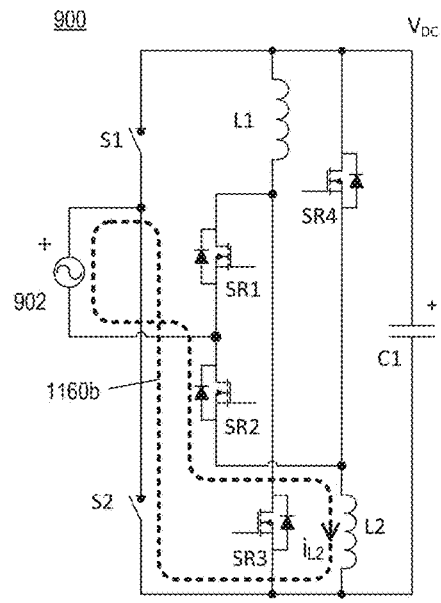

FIGS. 11A and 11B illustrate current flow paths 1160a, 1160b for a buck mode wherein the DC source 940 is stepped down to provide a positive voltage $V_{AC}$ at the AC load 902. The second inductor L2 is used as an energy-storage device during this buck mode. The controller 930 sets the control signals for the bi-directional switches S1, S2 and the active switches so as to alternate between the current paths 1160a, 1160b of FIGS. 11A and 11B, and generate a desired (positive) voltage $V_{AC}$ at the AC load 902.

Figure 11C:
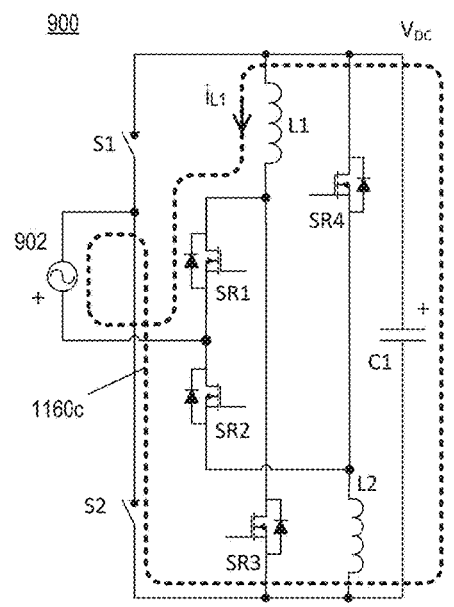
Figure 11D:
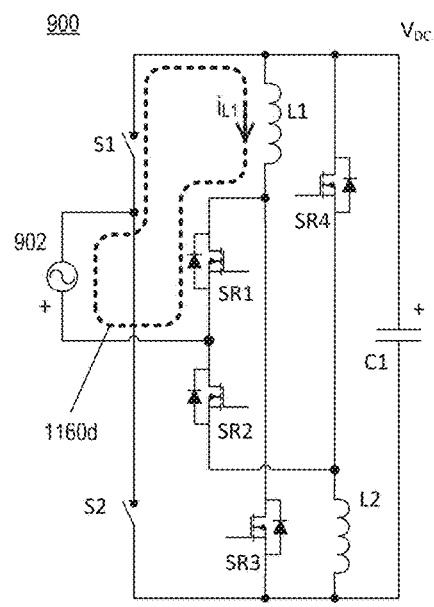

FIGS. 11C and 11D illustrate current flow paths 1160c, 1160d for a buck mode wherein the DC source 940 is stepped down in magnitude and provides a negative voltage $V_{AC}$ at the AC load 902. The first inductor L1 is used as an energy-storage device during this buck mode. The controller 930 sets the control signals for the bi-directional switches S1, S2 and the active switches so as to alternate between the current paths 1160c, 1160d of FIGS. 11C and 11D, and generate a desired (negative) voltage $V_{AC}$ at the AC load 902.

The controller 930 cycles through the four modes described above to generate one period of an AC voltage waveform provided to an AC load 902, as follows:

1) buck mode to generate positive voltage at AC load 902,
2) boost mode to generate positive voltage at AC load 902,
3) buck mode to generate positive voltage at AC load 902,
4) buck mode to generate negative voltage at AC load 902,
5) boost mode to generate negative voltage at AC load 902, and
6) buck mode to generate negative voltage at AC load 902.

By varying the step up or step down amount for each of these modes, the controller 930 can generate one cycle (period) of an AC voltage for the AC load 902 by following steps (1)-(6) above. The resultant voltage waveform may resemble the waveform $V_{AC\_IN}$ illustrated in FIG. 7, though the generated waveform should be considered an output rather than an input. The controller 930 follows the above steps repeatedly, to generate an AC voltage to power an AC load 902.

The power converters described herein, and particularly the power converter 900 of FIG. 9, offer several advantages over conventional power converters. By using bi-directional switches, the described power converters are able to both rectify an AC voltage and generate a desired DC voltage for supplying a load, while using minimal circuitry. Conduction losses are minimized due to the minimal circuitry and due to controlling current flow using switches rather than diodes. The described power converters can operate in buck or boost mode, as needed. Furthermore, the described power converters can convert from an AC source to provide DC power for a load, or convert power from a DC source to provide AC power for a load.

As shown in FIGS. 5A-5D, 6A-6D, 10A-10D, and 11A-11D, current only flows through a single inductor for any of the conduction paths. Other power converters, particularly buck boost converters, often require that current flow simultaneously through multiple inductors within any serial conduction path through the power converter, which increases inductor conduction losses. (While often treated as ideal components with no resistance, practical inductors have an associated equivalent series resistance (ESR) and related conduction losses.) For boost operation, current only flows through a total of two switches or diodes at a given time within a serial conduction path. For buck operation, current flows through either one or two switches or diodes within a serial conduction path, depending on the particular time interval. Conventional power converters capable of operating in buck or boost modes typically require that current simultaneously flows through more devices than this within any serial conduction path through the power converter, and incur the associated conduction losses.

As used herein, the terms "having," "containing," "including," "comprising," and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A power converter comprising:
    a first alternating current (AC) terminal and a second AC terminal, the first and second AC terminals coupled across an AC power source or load;
    a first direct current (DC) terminal and a second DC terminal, the first and second DC terminals coupled across a DC power source or load;
    a first bi-directional switch coupled between the first AC terminal and the first DC terminal;
    a second bi-directional switch coupled between the first AC terminal and the second DC terminal;
    a first inductor and a first current-blocking device connected in series and coupling the second AC terminal to the first DC terminal;
    a second inductor and a second current-blocking device connected in series and coupling the second AC terminal to the second DC terminal; and
    a controller configured to control the first and second bi-directional switches so as to operate the power converter in a first operational mode in which a DC voltage across the DC power source or load is lower than a present voltage across the AC power source or load, or a second operational mode in which the DC voltage is higher than the present voltage, or both the first and the second operational modes,
    wherein each of the first and second bi-directional switches has a conducting mode in which current conducts in both directions and a blocking mode in which current is blocked in both directions.

2. The power converter of claim 1, further comprising:
    a third current-blocking device that is coupled between the second DC terminal and a node between the first inductor and the first current-blocking device; and
    a fourth current-blocking device coupled between the first DC terminal and a node between the second inductor and the second current-blocking device.

3. The power converter of claim 2, wherein at least one of the third and fourth current-blocking devices is a silicon carbide (SiC) Schottky diode.

4. The power converter of claim 2, wherein at least one of the third and fourth current-blocking devices is a synchronous rectification (SR) switch.

5. The power converter of claim 1, wherein at least one of the first and second current-blocking devices is a diode.

6. The power converter of claim 1, wherein at least one of the first and second current-blocking devices is a synchronous rectification (SR) switch.

7. The power converter of claim 1, wherein at least one of the first and second bi-directional switches is a bi-directional gallium nitride (GaN) high-electron-mobility transistor (HEMT) comprising two gates that share a common drift region.

8. The power converter of claim 1, wherein at least one of the first and second bi-directional switches is one of:
    a bi-directional metal-oxide semiconductor field-effect transistor (MOSFET) having a common source;
    a bi-directional MOSFET having a common drain;
    a bi-directional insulated-gate bipolar transistor (IGBT) having a common collector;
    a bi-directional IGBT having a common emitter; and
    a bi-directional discrete IGBT with bridge diodes.

9. The power converter of claim 1, wherein the first and second AC terminals are coupled across an AC power source, the first and second DC terminals are coupled across a DC power load, the controller is configured to convert power from the AC power source to power for the DC power load, the first operational mode is a buck mode, and the second operational mode is a boost mode.

10. The power converter of claim 9, wherein the DC power load has a target reference voltage, and wherein the controller is further configured to:
    measure the present voltage across the AC power source;
    switch the first and second bi-directional switches so as to operate the power converter in the buck mode responsive to detecting that a magnitude of the present measured voltage is higher than the target reference voltage; and
    switch the first and second bi-directional switches so as to operate the power converter in the boost mode responsive to detecting that a magnitude of the present measured voltage is lower than the target reference voltage.

11. The power converter of claim 10, wherein controller operation for the buck mode comprises:
    detecting whether the measured present voltage is positive or negative;
    responsive to detecting a positive measured voltage:
        setting the second bi-directional switch to the blocking mode,
        generating a first pulse-width-modulated (PWM) waveform to control the first bi-directional switch such that a frequency, a duty cycle, or both of the first PWM waveform determine a load voltage across the DC power load, and
        adjusting the frequency or the duty cycle or both of the first PWM waveform to maintain the load voltage at or near the target reference voltage; and
    responsive to detecting a negative measured voltage:
        setting the first bi-directional switch to the blocking mode,
        generating a second pulse-width-modulated (PWM) waveform to control the second bi-directional switch such that a frequency, a duty cycle, or both of the second PWM waveform determine the load voltage, and
        adjusting the frequency or the duty cycle or both of the second PWM waveform to maintain the load voltage at or near the target reference voltage.

12. The power converter of claim 10, wherein controller operation for the boost mode comprises:
    detecting whether the measured present voltage is positive or negative;
    responsive to detecting a positive measured voltage:
        for a first positive interval, setting the second bi-directional switch to the conducting mode and setting the first bi-directional switch to the blocking mode, thereby energizing the second inductor, and
        for a second positive interval, setting the first bi-directional switch to the conducting mode and setting the second bi-directional switch to the blocking mode, thereby de-energizing the second inductor; and responsive to detecting a negative measured voltage:
for a first negative interval, setting the first bi-directional switch to the conducting mode and setting the second bi-directional switch to the blocking mode, thereby energizing the first inductor, and
for a second negative interval, setting the second bi-directional switch to the conducting mode and setting the first bi-directional switch to the blocking mode, thereby de-energizing the first inductor.

13. The power converter of claim 2, wherein:
the first and second DC terminals are coupled across a DC power source,
the first and second AC terminals are coupled across an AC power load,
the first current-blocking device is a first active switch, the second current-blocking device is a second active switch, the third current-blocking device is a third active switch and the fourth current-blocking device is a fourth active switch,
the controller is configured to convert power from the DC power source to power for the AC power load,
the first operational mode is a boost mode, and
the second operational mode is a buck mode.

14. The power converter of claim 13, wherein the controller is further configured to:
measure a DC voltage across the DC power source;
determine a desired voltage across the AC power load for a given instant of time;
switch the first and second bi-directional switches so as to operate the power converter in the boost mode responsive to detecting that the desired voltage is higher than the measured DC voltage; and
switch the first and second bi-directional switches so as to operate the power converter in the buck mode responsive to detecting that the desired voltage is lower than the measured DC voltage.

15. The power converter of claim 14, wherein controller operation for the boost mode comprises:
determining whether the desired voltage is positive or negative;
responsive to determining that the desired voltage is positive:
setting the second bi-directional switch to the blocking mode,
generating a first pulse-width-modulated (PWM) waveform to control the fourth active switch such that a frequency, a duty cycle, or both of the first PWM waveform determine a generated voltage across the AC power load, and
adjusting the frequency or the duty cycle or both of the first PWM waveform to minimize a difference between the generated voltage and the desired voltage; and
responsive to determining that the desired voltage is negative:
setting the first bi-directional switch to the blocking mode,
generating a second pulse-width-modulated (PWM) waveform to control the third active switch such that a frequency, a duty cycle, or both of the second PWM waveform determine a generated voltage across the AC power load, and
adjusting the frequency or the duty cycle or both of the second PWM waveform to minimize a difference between the generated voltage and the desired voltage.

16. The power converter of claim 14, wherein controller operation for the buck mode comprises:
determining whether the desired voltage is positive or negative;
responsive to determining that the desired voltage is positive:
for a first positive interval, setting the first bi-directional switch to the conducting mode and setting the second bi-directional switch to the blocking mode, thereby energizing the second inductor, and
for a second positive interval, setting the second bi-directional switch to the conducting mode and setting the first bi-directional switch to the blocking mode, thereby de-energizing the second inductor; and
responsive to detecting that the desired voltage is negative:
for a first negative interval, setting the second bi-directional switch to the conducting mode and setting the first bi-directional switch to the blocking mode, thereby energizing the first inductor, and
for a second negative interval, setting the first bi-directional switch to the conducting mode and setting the second bi-directional switch to the blocking mode, thereby de-energizing the first inductor.

17. A power converter configured to operate as at least one of an alternating current (AC) to direct current (DC) converter and a DC-to-AC converter, the power converter comprising:
a first AC terminal and a second AC terminal, the first and second AC terminals coupled across an AC power source or load;
a first DC terminal and a second DC terminal, the first and second DC terminals coupled across a DC power source or load;
a first bi-directional switch and a second bi-directional switch coupled to the first AC terminal, wherein each of the first and second bi-directional switches has a conducting mode in which current conducts in both directions and a blocking mode in which current is blocked in both directions;
a first inductor and a second inductor, each of which is configured to store energy during an inductor charging interval and release energy during an inductor discharging interval;
a first current-blocking device configured to limit positive current flow within the first inductor to a first direction during an AC-to-DC interval in which the power converter is operating as an AC-to-DC converter;
a second current-blocking device configured to limit positive current flow within the second inductor to a first direction during the AC-to-DC interval; and
a controller configured to control the first bi-directional switch and the second bi-directional switch, when the power converter is configured as an AC-to-DC converter:
in a buck mode for a buck interval, wherein a present voltage across the AC power source or load is stepped down to supply a DC voltage to the DC power source or load, and
in a boost mode for a boost interval, wherein the present voltage is stepped up to supply the DC voltage.

18. The power converter of claim 17,
wherein for any serial path loop of the power converter through which positive current flows at a given instant of time, current flows through a maximum of one inductor and a maximum of two current-blocking devices, wherein a current-blocking device is a diode or a switch.

19. The power converter of claim 18,
wherein during the buck interval, when the first inductor is in its discharging interval or the second inductor is in its discharging interval, current flows through a single current-blocking device within the power converter.

20. A bi-directional active rectifying bridge (BARB) comprising:
a first AC terminal and a second AC terminal coupled across an AC power source;
a first rectified terminal and a second rectified terminal, the first and second rectified terminals supplying rectified voltage at a rectified output;
a first bi-directional switch coupled between the first AC terminal and the first rectified terminal,
a second bi-directional switch coupled between the first AC terminal and the second rectified terminal;
a first current-blocking device coupled between the second AC terminal and the first rectified terminal;
a second current-blocking device coupled between the second AC terminal and the second rectified terminal; and
a controller configured to control the first and second bi-directional switches so as to provide the rectified voltage at the rectified output, the control of the first and second bi-directional switches being based upon a measured voltage across the first and second AC terminals,
wherein each of the first and second bi-directional switches has a conducting mode in which current conducts in both directions and a blocking mode in which current is blocked in both directions.

21. The BARB of claim 20, wherein the first and second bi-directional switches are bi-directional gallium nitride (GaN) high-electron-mobility transistors (HEMTs), each of which has two gates that share a common drift region.

* * * * *